Dec. 11, 1934.     N. BOUVENG     1,984,111
FILM MAGAZINE
Filed March 28, 1931     2 Sheets-Sheet 1

Inventor,
Nils Bouveng
By Newton M. Perriss
Rolla N. Carter
Attorneys.

Dec. 11, 1934.    N. BOUVENG    1,984,111
FILM MAGAZINE
Filed March 28, 1931    2 Sheets-Sheet 2
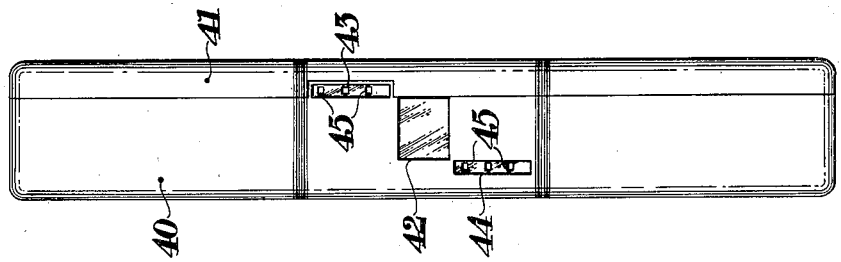
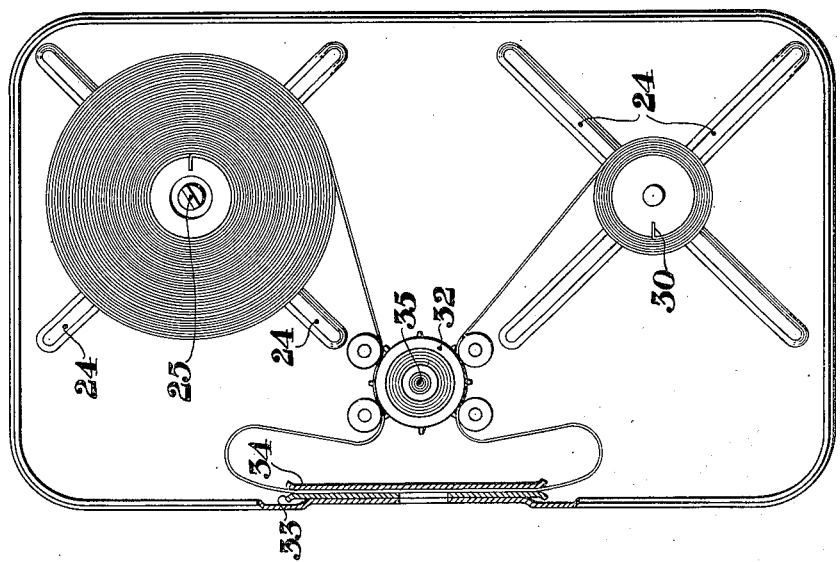
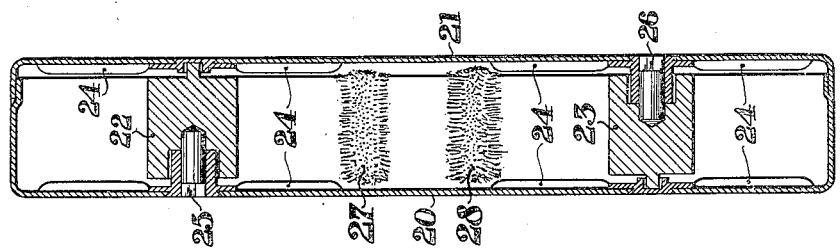

Patented Dec. 11, 1934

1,984,111

UNITED STATES PATENT OFFICE 1,984,111

FILM MAGAZINE

Nils Bouveng, Elga, Setsjabaden, Sweden, assignor to Eastman Kodak Company, Rochester, N. Y., a corporation of New York Application March 28, 1931, Serial No. 526,027

8 Claims. (Cl. 88—17)

REISSUED

This invention relates to motion picture apparatus and more particularly to a reversible film magazine for motion picture cameras.

In making two series of pictures on a single width of film, the film is passed through the camera exposing one-half of its width and then the take-up and supply reels are interchanged and reversed so that the remaining half width of the film will be exposed when again passed through the camera. With such a process it is desirable to in some way assure the operator that the second passage of the film through the camera will expose the remaining unused portion of the film rather than double expose the portion already used.

It is an object of this invention to provide a film spooling system such that it will be impossible for the operator to operatively place the spooling system in the camera in other than the correct position.

Another object of this invention is to provide a film magazine having two spools or film cores adapted to carry the film which is loaded by the supplier and not opened until in the hands of the processer.

Other objects and advantages of this invention will appear from the following description when read in connection with the accompanying drawings in which:

Fig. 3 is a rear elevation in section of the magazine illustrated in Fig. 2 with the film removed.

Fig. 5 is a side view of a modification of the magazine of this invention; and

Fig. 6 is a front elevation of the magazine shown in Fig. 5.

Figure 1:
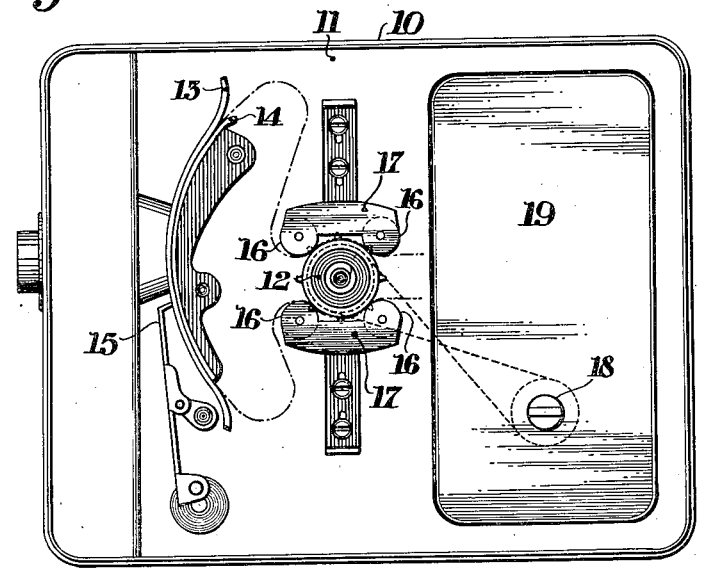
Fig. 1 is a side view of an open camera adapted to receive the magazine of this invention.

In Fig. 1 is shown a camera of a well known type and only such parts are shown as are deemed necessary to a complete understanding of this invention.

As illustrated, the camera comprises a casing 10, one side of which is removable and is not shown. A central longitudinal partition 11 separates the driving mechanism (not shown) from the film handling means which are mounted on the partition 11. As indicated by the broken line, the film is adapted to pass over a sprocket 12, pass between curved gate members 13 and 14 through which it is drawn by a suitable pull-down claw 15 and again over the sprocket 12. The film is held against the sprocket 12 by the rollers 16 carried on the sliding supports 17.

Extending through the partition 11 is a shaft 18 adapted to drive the take-up core as hereinafter described. The sprocket 12, the pull down claw 15 and the shaft 18 are adapted to be driven simultaneously by suitable mechanism not shown. Suitable means for positioning a magazine in the camera may be provided such as depressing a portion 19 of the partition 11 to correspond to the shape of the magazine, although it is to be understood that any other magazine positioning means may be provided.

Figure 2:
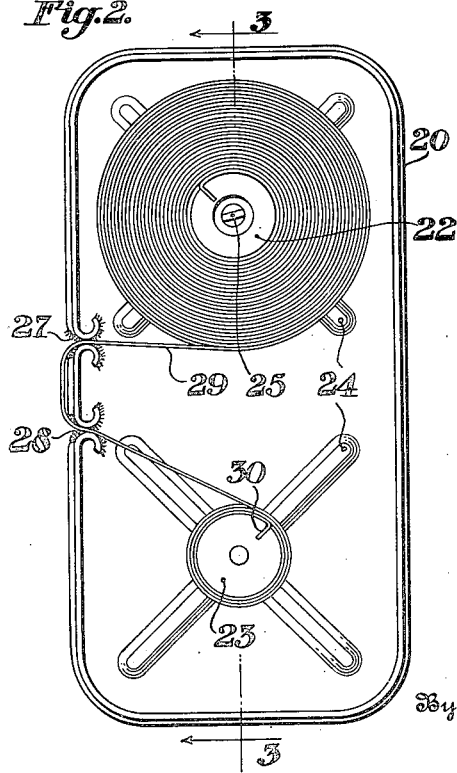
Fig. 2 is a side view of a magazine embodying this invention with one wall removed.

The magazine illustrated in Figs. 2 and 3 comprises a casing 20 provided with a wall 21 which may be removed for loading and unloading purposes. Suitably mounted in the magazine are two film cores 22 and 23 adapted to hold the film. These cores may be provided with suitable flanges for holding the film in proper position, but it is preferred to form indentations 24 in the casing 20 and cover 21 to accomplish this result. The core 22 is mounted for free rotation in the magazine and is provided with a slot 25 or other suitable drivable means available through the casing 20 to be connected with the shaft 18 for driving the core 22. The core 23 is likewise mounted for free rotation and is provided with a similar slot 26 which is available through the cover 21 for connection with the shaft 18 of the camera. One edge of the magazine is provided with suitable film openings 27 and 28 which are rendered light tight by means of a black velvet lining or any other suitable means well known in this art. In loading the magazine the cover 21 is removed as in Fig. 2 and a film 29 is secured to and wound around the core 22. The loose end of the film 29 is then threaded out through the opening 27 and into the opening 28, and frictionally secured to the core 23 by insertion in the slot 30 as is well known. The cover 21 is now replaced and need not be removed until it is desired to remove the film for processing.

Figure 4:
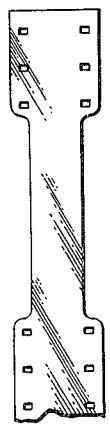
Fig. 4 shows a section of film which has been altered for control purposes.

When it is desired to insert the magazine in the camera, the portion of the film appearing outside the magazine between the openings 27 and 28 is pulled out from the core 22 to form a loop of sufficient size to thread over the sprocket 12 and through the gate members 13 and 14. The magazine is now placed in the camera so that the core 23 becomes the take-up core, that is, the slot 26 of the core 23 is engaged with the shaft 18 and the loop of film is threaded as above indicated. The film is now ready to be run through the camera to expose one-half of its width through a half-width gate or otherwise, as is well known. Near the end of the film secured to the core 22 the width of the film is reduced by cutting or otherwise as shown in Fig. 4 to insure that the feeding operation is stopped before the end of the film is removed from the core 22. It is now desirable to expose the remaining half width of the film and to accomplish this the film is unthreaded and the magazine is reversed, that is, the magazine is removed and replaced in the camera so that the slot 25 connects with the shaft 18 and the core 22 becomes the take-up core. The film is again threaded through the sprocket 12 and the gate members 13 and 14 and upon operation of the camera the remaining half width of the film is exposed. The end of the film secured to the core 23 is of normal width and permits the entire length of film to pass through the camera and be wound upon the core 22 from which it can not again be passed through the camera without first removing the cover 21, which the operator is instructed not to do.

It will be seen from the above that I have provided a film magazine which must, from necessity, be so placed in the camera that the second passage of film through the camera cannot expose the same half width of the film that was exposed during its first passage through the camera. For convenience, a suitable legend may be placed on the magazine to indicate to the operator the position in which the magazine should first be inserted in the camera.

One modification of this invention is illustrated in Fig. 5 as comprising a magazine similar to the one above described but in which the feeding sprocket 32 and the gate members 33 and 34 are incorporated in the magazine structure. The camera structure may be readily altered to accommodate this magazine by positioning the pull-down mechanism so that the claw will properly cooperate with the film in the gate members 33 and 34, which members may be straight as shown, or may be curved if desired. In addition, the camera should have a drive shaft suitably located to connect with the drivable means 35 provided at each end of the sprocket 32. It is to be noted that the cores 22 and 23 are symmetrically disposed relative to the sprocket 32 and the gate members 33 and 34 so that the sprocket 32 will be drivably connected to its shaft for both positions of the magazine, that is, when the core 22 is in take-up position, as well as when the core 23 is in take-up position.

Those skilled in the art will readily understand that the size and location of the picture may be determined by the camera aperture in a well-known manner. For the purpose of this invention the camera aperture preferably is one half the width of the film between the perforations, and is of a height equal to the effective stroke of the pulldown mechanism. With the aperture and lens of the camera properly positioned, it is readily apparent that only one half width of the film will be exposed by any one exposure.

In practice this modified magazine is loaded by the supplier and the customer receives it with the bulk of the film on the core 22, the lead of the film being threaded over the sprocket 32 and between the gate members 33 and 34 and secured to the core 23. The customer places the magazine in the camera with the core 23 in take-up position and exposes one-half width of the film. The passage of the film through the camera is stopped by a reduced width of film, as above described, while the end of the film is still secured to the supply core 22. The magazine is now removed and placed in the camera in reversed position so that the core 22 becomes the take-up core and the film is again passed through the camera to expose the remaining half width of film. This time the camera is operated until all of the film is wound on the take-up core 22 and therefore cannot be passed through the camera again without removing the cover 21 and rethreading the film, which operation the customer has been warned not to do. The magazine is now returned to the processor who removes the film and reloads the magazine with raw film whereupon it is ready to be sold to another customer.

In Fig. 6 I have illustrated one arrangement of the exposure window 42 and the pull-down slots 43 and 44 for the magazine shown in Fig. 5. It will be noted that the slots 43 and 44 are symmetrically disposed about the window 42 so as to occupy the same position in the camera for both positions of the magazine. The slots 43 and 44 are of sufficient length to uncover at least two perforations 45 of the film. It will be obvious that if a two claw pull-down is to be used, two slots may be provided in the casing.

A mask for determining the size of the picture area should be mounted on the camera behind the lens. If four pictures are to be taken on an ordinary picture area it will be obvious that the mask should cover three quarters of the exposure window and one half of the window if only two pictures are to be taken on the normal picture area.

While two embodiments of this invention have been described in detail to comply with the requirements of the statutes, it is to be understood that it is not limited to the exact arrangements described inasmuch as, in view of the disclosure, obvious modifications will readily suggest themselves to those familiar with this art without departing from the spirit of this invention or the scope of the claims herein.

What I claim as new and desire to be secured by Letters Patent of the United States is:

1. A reversible motion picture film magazine comprising a light-tight casing with opposite parallel flat walls, two parallel film cores rotatably mounted within said casing, one wall having an opening axially of one core and the other having an opening axially of the other core; each core having a clutch member within the casing opposite and engageable through the respective opening and a sprocket also mounted entirely within the casing parallel to the cores and having clutch elements at each end and openings in both side walls axially of the sprocket, whereby the magazine is free from protruding parts and may be utilized in inverted positions.

2. A magazine for motion picture apparatus comprising a casing having a wall with an exposure window and having opposite parallel walls, each of the parallel walls having a single opening, two parallel film cores rotatably mounted within said casing and axially of said openings, each of said cores having a drivable means in one end opposite the corresponding opening, whereby they may be alternately engaged by a driving element to wind film from either to the other, said first named wall having two slots diametrically symmetrical with respect to the center of the exposure window, whereby the magazine may be completely inverted between two positions and be capable in each position of cooperating with the same film engaging claw operating through one slot and the same driving element operating through one opening.

3. In a magazine for motion picture apparatus, the combination with a pair of film cores, of magazine walls enclosing said cores, an exposure window in the magazine, slots in said magazine adapted to receive film positioning means and symmetrically arranged about said window, a sprocket for moving a film towards and away from said window, drivable means for said sprocket adapted to cooperate with driving means of the motion picture apparatus through either wall of said magazine and drivable means for each core adapted to cooperate alternately with a single driving means of said apparatus.

4. A magazine for a motion picture apparatus comprising a closed casing, rotatable parallel cores mounted within said casing and each having means whereby it may be turned, a film band attached at its ends to said cores and wound thereon, means preventing detachment of the band from one of said cores when the band is wound upon the other, and the film being detachably connected to the other core whereby it may be completely wound upon the first core but not upon the second.

5. A reversible magazine for motion picture apparatus comprising side walls and an edge wall, cores mounted between said walls, one core having a driving means at one end and the other core having a driving means at the other end, a film strip with perforated edges wound on and attached to the cores, the edge wall having an exposure gate and slots symmetrically located with respect to the gate, one being in line with one edge of the gate and on one side thereof and the other being in line with the other edge of the gate and on the other side thereof, and means to guide the film from one core to the other, past said gate and slots with the perforations of one edge behind one slot and the perforations of the other edge behind the other slot.

6. A reversible motion picture film magazine comprising a casing and film supporting means therein, and means to guide film in a definite path in either direction along said path, one wall of the casing having an exposure gate along the path of the film and having also two slots, one on one side of the gate opposite the path of one edge of the film and the other on the other side of the gate symmetrically opposite the first with respect to the gate and opposite the path of the other edge of the film.

7. A reversible magazine for motion picture apparatus comprising a relatively thin casing having opposed side walls and a narrow peripheral wall connecting the edges of the side walls, cores rotatably mounted between the side walls, a strip of film wound upon and connected at its ends to the two cores and having uniformly spaced perforations along its edges, said peripheral wall having an exposure gate therein, means for guiding and supporting a portion of the film at said gate, two slots of greater length than the distance between consecutive apertures in the film, one slot being on one side of the gate and in registry with one edge of the film and the other slot being symmetrically opposite to the first with respect to the gate and in registry with the other edge of the film.

8. A reversible magazine for use in a motion picture camera and comprising a light-tight casing having side walls and a peripheral wall connecting the edges of the side walls, each side wall having a single opening therein, a pair of spaced cores rotatably mounted between the walls axially of the respective openings and entirely within the casing, the end of each core opposite the respective opening having a clutch element thereon adapted to be engaged through the opening, the peripheral wall having an exposure gate therein and slots symmetrically positioned on each side of said exposure gate and in line with opposite edges of said gate, whereby the magazine may be used in either of two inverted positions in a camera having a clutch element adapted to engage the cores alternatively and having a pull-down claw adapted to operate in the slots alternatively to advance film through the magazine.

NILS BOUVENG.